(12) United States Patent
Feng (10) Patent No.: US 12,494,928 B2
(45) Date of Patent: Dec. 9, 2025

(54) REGISTRATION AND EXECUTION METHODS, APPARATUSES AND SYSTEM OF TIMED SMART CONTRACT IN BLOCKCHAIN

(71) Applicant: Digital Currency Institute, The People's Bank of China, Beijing (CN)

(72) Inventor: Kaikai Feng, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 210 days.

(21) Appl. No.: 18/276,878

(22) PCT Filed: Feb. 10, 2022

(86) PCT No.: PCT/CN2022/075943
§ 371 (c)(1),
(2) Date: Aug. 10, 2023

(87) PCT Pub. No.: WO2022/171188
PCT Pub. Date: Aug. 18, 2022

(65) Prior Publication Data
US 2024/0121121 A1    Apr. 11, 2024

(30) Foreign Application Priority Data
Feb. 10, 2021 (CN) .......................... 202110185555.8

(51) Int. Cl.
*H04L 9/00* (2022.01)
*H04L 9/32* (2006.01)

(52) U.S. Cl.
CPC .............. *H04L 9/50* (2022.05); *H04L 9/3297* (2013.01)

(58) Field of Classification Search
CPC ......... H04L 9/50; H04L 9/3297; H04L 67/10; H04L 67/104; H04L 67/1097; G06Q 2220/00; G06Q 30/06; G06Q 40/04
See application file for complete search history.

(56) References Cited

U.S. PATENT DOCUMENTS

| 11,398,911 B1* | 7/2022 | Gunning .............. G07F 17/0014 |
| 2017/0085595 A1* | 3/2017 | Ng .......................... G06Q 40/06 |

(Continued)

FOREIGN PATENT DOCUMENTS

| CN | 109474701 A | 3/2019 |
| CN | 110633286 A | 12/2019 |

(Continued)

OTHER PUBLICATIONS

The search report of counterpart EP application No. 22752348.7 issued on Jan. 21, 2025.

*Primary Examiner* — Javier O Guzman
(74) *Attorney, Agent, or Firm* — The Sun IP Law (57) ABSTRACT

Disclosed are a registration method, an execution method, an execution apparatus and an execution system of a timed smart contract in a blockchain, and relates to the technical field of computers. The method includes: a registration request of the timed smart contract is received; according to the registration request, an interface for the timed smart contract connecting to an oracle contract is generated for the timed smart contract, where the oracle contract is deployed on the blockchain and configured to receive time information sent by a trusted oracle, so as to supply the time information to the timed smart contract through the interface. The management and execution of the timed smart contract are realized via the blockchain.

19 Claims, 7 Drawing Sheets

(56) References Cited

U.S. PATENT DOCUMENTS

| | | | | |
|---|---|---|---|---|
| 2018/0218176 A1* | 8/2018 | Voorhees | ............... | G06Q 20/02 |
| 2018/0331835 A1* | 11/2018 | Jackson | ................ | H04L 9/3297 |
| 2019/0013948 A1* | 1/2019 | Mercuri | ............ | G06Q 20/3827 |
| 2019/0080406 A1* | 3/2019 | Molinari | ................ | G06Q 40/02 |
| 2019/0095880 A1* | 3/2019 | Glover | ................. | H04L 9/0643 |
| 2019/0114706 A1* | 4/2019 | Bell | ....................... | G06Q 40/03 |
| 2019/0158275 A1* | 5/2019 | Beck | ................. | G06Q 20/0658 |
| 2019/0180291 A1* | 6/2019 | Schmeling | ............. | G16H 20/10 |
| 2019/0188399 A1* | 6/2019 | Palaniappan | ......... | H04L 9/0618 |
| 2019/0354989 A1 | 11/2019 | Saket et al. | | |
| 2019/0361842 A1* | 11/2019 | Wood | ................... | G06V 30/418 |
| 2020/0005282 A1* | 1/2020 | Kim | .................... | G06Q 20/065 |
| 2020/0007513 A1* | 1/2020 | Gleichauf | ............ | G06F 21/105 |
| 2020/0111092 A1* | 4/2020 | Wood | ................... | G06Q 40/04 |
| 2020/0233966 A1* | 7/2020 | Bursell | ................ | G06F 16/182 |
| 2020/0387500 A1* | 12/2020 | Malfiza Garcia de Macedo | ........ | G06F 16/27 |
| 2021/0135855 A1* | 5/2021 | Sunkavally | ........... | H04L 9/0825 |

FOREIGN PATENT DOCUMENTS

| | | |
|---|---|---|
| CN | 110659907 A | 1/2020 |
| CN | 111367621 A | 7/2020 |
| CN | 111753011 A | 10/2020 |
| CN | 111818185 A | 10/2020 |
| CN | 112837157 A | 5/2021 |
| IN | 110992020 A | 4/2020 |

* cited by examiner

REGISTRATION AND EXECUTION METHODS, APPARATUSES AND SYSTEM OF TIMED SMART CONTRACT IN BLOCKCHAIN

TECHNICAL FIELD

The present disclosure relates to the field of blockchains, and more particularly relates to a registration and execution methods, apparatuses and system of a timed smart contract in a blockchain.

BACKGROUND

A blockchain may be thought of as a decentralized and trusted distributed ledger. Since the blockchain consists of many nodes to form an end-to-end network, there is no centralized apparatus and management mechanism, and data is stored and recorded in the blockchain in a distributed manner, so that the blockchain is tamper-resistant. Therefore, digitally writing a smart contract into the blockchain and completing a corresponding transaction by executing the smart contract in the blockchain have been increasingly favored by various institutions.

At present, the smart contract existing in the blockchain typically requires an external transaction to trigger execution. For some transactions that need to be triggered in a timing manner, such as realizing fixed-time reconciliation between financial institutions, it is still an urgent problem to be solved by existing smart contract management and execution modes.

SUMMARY

Thus, the embodiments of the present disclosure relate to a registration method, an execution method, an execution apparatus and an execution system of a timed smart contract in a blockchain, thereby realizing management and execution of the timed smart contract through the blockchain.

According to one aspect of the embodiment of the present disclosure, a registration method of a timed smart contract in a blockchain is provided and includes:
  receiving a registration request of the timed smart contract; and
  according to the registration request, generating, for the timed smart contract, an interface for the timed smart contract connecting to an oracle contract, wherein the oracle contract is deployed on the blockchain and configured to receive time information sent by a trusted oracle, so as to supply the time information to the timed smart contract through the interface.

As at least one alternative embodiment, the registration method for the timed smart contract in the blockchain further including:
  generating a corresponding transaction block for other smart contract, and recording a transaction corresponding to the other smart contract in the transaction block, wherein the other smart contract is a smart contract without an event-triggered function, and thus is executed based on the transaction block.

As at least one alternative embodiment, the registration method for the timed smart contract in the blockchain further including:
  for the timed smart contract, generating a corresponding built-in block or a built-in region in a transaction block; and
  configuring a corresponding amount of consumable resources for the built-in block or the built-in region in the transaction block, and recording a transaction corresponding to the timed smart contract in the transaction block so that the timed smart contract is able to be executed based on the built-in block or the built-in region in the transaction block.

As the second aspect, an execution method of a timed smart contract in a blockchain is provided, including:
  providing time information, sent by a trusted oracle, to an oracle contract, wherein the trusted oracle is elected from a plurality of oracles;
  providing the time information to the timed smart contract through an interface, wherein the timed smart contract includes a time-triggered function and is connected to the oracle contract through the interface; and
  executing the timed smart contract under a condition the time information satisfies the time-triggered function.

As at least one alternative embodiment, the execution method of the timed smart contract in the blockchain further including:
  adopting a polling mode to determine the trusted oracle from the plurality of oracles;
  or,
  adopting a vote mode to select the trusted oracle from the plurality of oracles.

As at least one alternative embodiment, the execution method of the timed smart contract in the blockchain further including:
  generating a log, and recording the time information in the log;
  when a lookup request of a trusted node or other trusted oracle in the blockchain is received, providing the log to the trusted node or the other trusted oracle; and
  according to a lookup result, verifying whether the time information recorded in the log is accurate or not,
  if not, marking the trusted oracle as being un-trusted and re-executing a step of electing the trusted oracle from the plurality of oracles.

As at least one alternative embodiment, the execution method of the timed smart contract in the blockchain further including:
  setting a transaction block for a non-timed smart contract, wherein a transaction corresponding to the other smart contracts is recorded in the transaction block; and
  executing the transaction block corresponding to the other smart contract when an execution trigger of the other smart contract is received.

As at least one alternative embodiment, the execution method of the timed smart contract in the blockchain further including: for the timed smart contract, setting a built-in block or a built-in region in a transaction block; and configuring a corresponding amount of consumable resources to the built-in block or the built-in region, wherein the built-in block or the built-in region records a transaction corresponding to the timed smart contract, and
  executing the timed smart contract including:
  when an execution trigger of the timed smart contract is received, judging whether an amount of resources currently required is not greater than the amount of consumable resources corresponding to the built-in block or the built-in region or not, if yes, executing the built-in block or the built-in region corresponding to the timed smart contract, and if not, forbidding execution.

As at least one alternative embodiment, the timed smart contract includes at least two time-triggered functions, and each time-triggered function corresponds to one processing logic in the timed smart contract; and executing the timed smart contract includes: executing a processing logic corresponding to a time-triggered function.

As the third aspect, a registration apparatus of a timed smart contract in a blockchain is provided, including: a receiving unit and a registration unit, wherein the receiving unit is configured to receive a registration request of the timed smart contract; and the registration unit is configured to, according to the registration request, generate, for the timed smart contract, an interface for the timed smart contract connecting to an oracle contract, wherein the oracle contract is deployed on the blockchain and configured to receive time information sent by a trusted oracle, so as to supply the time information to the timed smart contract through the interface.

As the fourth aspect, an execution apparatus of a timed smart contract in a blockchain is provided, including: an interaction unit, and an interface corresponding to each timed smart contract and an execution unit, wherein the interaction unit is configured to supply time information, sent by a trusted oracle, to an oracle contract, and the trusted oracle is elected from a plurality of oracles;

the interface corresponding to each timed smart contract is configured to correspondingly connect a corresponding timed smart contract to the oracle contract and supply the time information received by the oracle contract to the timed smart contract, wherein the timed smart contract includes a time-triggered function; and the execution unit is configured to execute the timed smart contract when the time information received by the timed smart contract satisfies the time-triggered function.

As the fifth aspect, an execution system of a timed smart contract in a blockchain is provided, including: a plurality of oracles and the execution apparatus of the timed smart contract in the blockchain above, wherein the execution apparatus of the timed smart contract in the blockchain is configured to elect a trusted oracle from the plurality of oracles; and after each oracle is elected as the trusted oracle, the oracle supplies time information to an oracle contract through the execution apparatus of the timed smart contract in the blockchain.

BRIEF DESCRIPTION OF THE DRAWINGS

Drawings are used for better understanding of the present disclosure, which do not constitute improper limitations on the present disclosure. Where.

DETAILED DESCRIPTION OF THE EMBODIMENTS

Exemplary embodiments of the present disclosure are illustrated below by combining drawings, and various details including the embodiments of the present disclosure facilitate understanding, which should be deemed to be exemplary only. Thus, those of ordinary skill in the art should realize that the embodiments described here can be variously transformed and modified, which cannot depart from the scope and spirit of the present disclosure. Similarly, for clearness and brevity, descriptions of well-known functions and structures are omitted in the following descriptions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The smart contract is a protocol including commitments or obligations defined by programming languages, on which contract participants may execute the commitments or obligations, and the protocol includes processing logics with a logic sequence.

Figure 1:
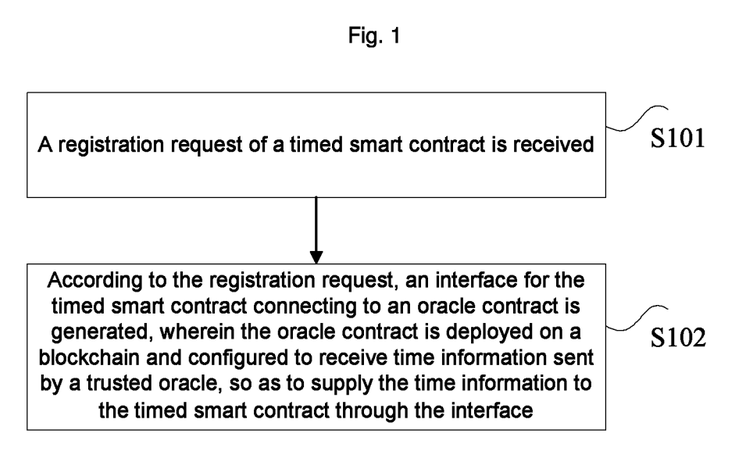
FIG. 1 is a schematic diagram of a main process of a registration method for a timed smart contract in a blockchain according to some embodiments of the present disclosure.

FIG. 1 is a registration method for a timed smart contract in a blockchain according to some embodiments of the present disclosure. As shown in FIG. 1, the registration method for a timed smart contract in a blockchain includes following steps:

S101: A registration request of the timed smart contract is received.

S102: According to the registration request, an interface for the timed smart contract connecting to an oracle contract is generated, where the oracle contract is deployed on the blockchain and configured to receive time information sent by a trusted oracle, so as to supply the time information to the timed smart contract through the interface.

The timed smart contract refers to a smart contract, which has a time-triggered function and may be timed-triggered by combining time and the time-triggered function. The time-triggered function is a time judgment function or conditional function. The time information (e.g., current time) is input into the time-triggered function so as to judge whether the time information satisfies the time-triggered function or not. If yes, the smart contract corresponding to the time-triggered function or logic execution in the smart contract corresponding to the time-triggered function is triggered.

The oracle contract refers to a kind of protocol, which is defined by programming languages, and may communicate with an external oracle, supply the time information to the connected timed smart contract, be independent of the oracle, and be deployed on the blockchain.

The trusted oracle refers to a kind of device, which is independent of the blockchain and can perform trusted communication with the oracle contract.

It is to be noted that the registration request may carry feature identity information of the timed smart contract, and correspondingly, there may be two implementations for generating the interface for the timed smart contract connecting to the oracle contract. A first implementation: a corresponding interface for each of a plurality of timed smart contracts is generated and feature identity information of the timed smart contract is set in the interfaces so as to supply time information to the timed smart contract; and a second implementation: one corresponding interface for the plurality of timed smart contracts is generated, and after receiving the registration request of one timed smart contract, the feature identity information of the timed smart contract is written into the interface, so that the interface supplies time information to the timed smart contract corresponding to the feature identity information included in the interface.

In the embodiments shown in FIG. 1, the interface for the timed smart contract connecting to the oracle contract may be generated by registering the timed smart contract deployed on the blockchain. After the oracle contract receives the time information sent by the trusted oracle, the time information is sent to the timed smart contract by the interface so that the timed smart contract can be executed at fixed time according to the time information, thereby managing and executing the timed smart contract through the blockchain.

In addition, execution of the timed smart contract needs to depend on a trust foundation of the whole chain. Thus, in the scheme provided by some embodiments of the present disclosure, the blockchain may be a consortium blockchain.

In some embodiments of the present disclosure, differentiated management of the timed smart contract and other smart contract except the timed smart contract is realized.

For the other smart contract except the timed smart contract, the registration method of the timed smart contract in the blockchain may further include: a corresponding transaction block for the other smart contract is generated, and a transaction corresponding to the other smart contract is recorded in the transaction block, where the other smart contract is a smart contract without the timed-triggered function, and thus is executed based on the transaction block.

The other smart contract refers to a smart contract needing to be triggered and executed by an external business or business data.

Figure 2:
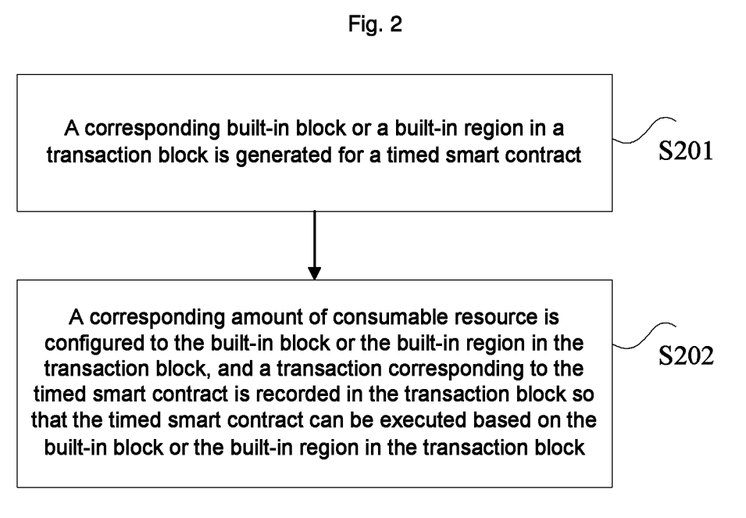
FIG. 2 is a schematic diagram of a main process of a registration method for a timed smart contract in a blockchain according to some embodiments of the present disclosure.

For the timed smart contract, as shown in FIG. 2, the registration method for the timed smart contract in the blockchain may further include following steps:

S201: For the timed smart contract, a corresponding built-in block or a built-in region in a transaction block is generated.

S202: A corresponding amount of consumable resources is configured to the built-in block or the built-in region in the transaction block, and a transaction corresponding to the timed smart contract is record in the transaction block so that the timed smart contract is able to be executed based on the built-in block or the built-in region in the transaction block.

The amount of consumable resources refers to the amount of resources capable of being currently supplied by a contracting party executing the timed smart contract.

The amount of current required resources refers to the amount of resources for which the contracting party of the timed smart contract needs to pay during timed smart contract execution.

By configuring the corresponding amount of consumable resources to the built-in block or the built-in region, when the amount of current required resources is lower than the amount of consumable resource, execution of a first smart contract will be enforced to be stopped, thereby solving a problem about shutdown caused by infinite loop.

It is to be understood that at least one transaction block needs to exist when the built-in region in the transaction block is generated for the timed smart contract. The transaction block may be a transaction block corresponding to other smart contract, and may also be the transaction block generated for the timed smart contract, and the built-in region is divided from the transaction block, and the corresponding amount of consumable resources is configured to the built-in region.

The transaction block is generated for the timed smart contract, and the built-in region is divided from the transaction block. The transaction block corresponding to the timed smart contract is configured to record the transaction record of the timed smart contract. Before the timed smart contract is executed, whether the amount of current resources is less than the amount of consumable resources corresponding to the built-in region or not, if yes, the timed smart contract is executed, and the transaction record of the timed smart contract is recorded in the transaction block except the built-in region, thereby separating a transaction record recording region from the built-in region, and facilitating transaction record management.

Figure 3:
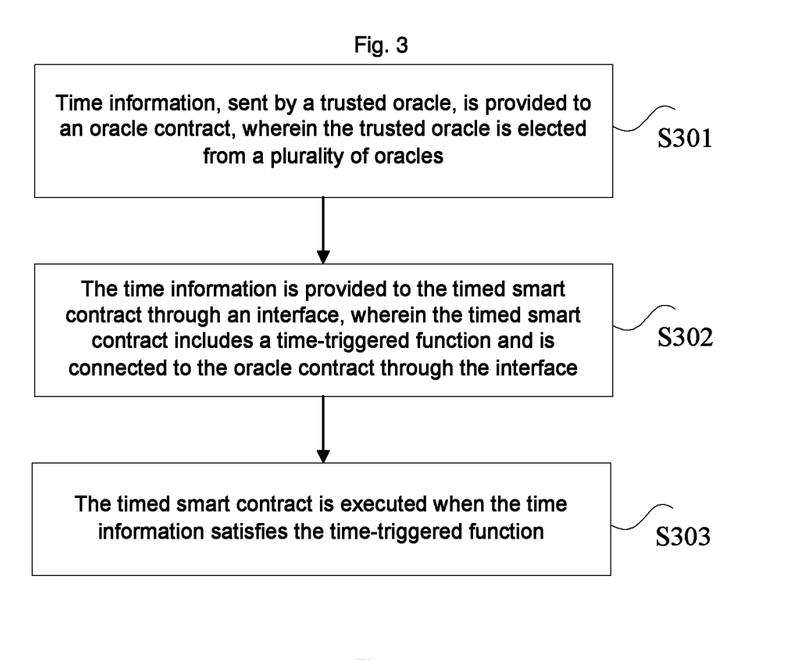
FIG. 3 is a schematic diagram of a main process of execution of a timed smart contract in a blockchain according to some embodiments of the present disclosure.

FIG. 3 is an execution method for a timed smart contract in a blockchain according to some embodiments of the present disclosure. As shown in FIG. 3, the execution method of the timed smart contract in the blockchain includes following steps:

S301: Time information, sent by a trusted oracle, is provided to an oracle contract, where the trusted oracle is elected from a plurality of oracles.

S302: The time information is provided to the timed smart contract through an interface, where the timed smart contract includes a time-triggered function and is connected to the oracle contract through the interface.

S303: The timed smart contract is executed under a condition the time information satisfies the time-triggered function.

The oracle contract, the trusted oracle, the timed smart contract and the time-triggered function mentioned and used in some embodiments are consistent to those in the foregoing embodiment or come from the foregoing embodiment.

For example, the time information includes current time. Correspondingly, the time information satisfying the time-triggered function refers that after the current time is added to the time-triggered function, the current time can satisfy condition limitation corresponding to the time-triggered function. The time-triggered function: $0.9\ h \le T_n - T_{n-1} \le 1.15\ h$, where $T_n$ denotes current time, and $T_{n-1}$ denotes execution time when a first smart contract is executed last time; 0.9 h denotes 0.9 hour, 1 h denotes 1 hour, and time being greater than or equal to 0.9 h and less than or equal to 1.15 h is a condition limitation corresponding to the time-triggered function; assuming that the execution time when the timed smart contract is executed last time is 10:00/5.20.2020, and the current time is 10:30/5.20.2020, the current time cannot satisfy the time-triggered function: $0.9\ h \le T_n - T_{n-1} \le 1.15\ h$; and assuming that the execution time when the timed smart contract is executed last time is 10:00/5.20.2020, and the current time is 11:00/5.20.2020, the current time satisfies the time-triggered function: $0.9\ h \le T_n - T_{n-1} \le 1.15\ h$. The current time may be obtained by multiplying a recorded block height by an average time interval in which each block is generated.

For another example, the time-triggered function: $f_1 - \theta \le Tn - T/K - 1 \le f_1 + \theta$, where $T_n$ denotes current time, and T denotes execution time when the timed smart contract is executed for the first time; $f_1$ denotes a time difference between every two adjacent times of execution, θ denotes an allowable error of the defined time difference, and K denotes the number of times of executing the timed smart contract corresponding to the time-triggered function; and correspondingly, a condition limitation corresponding to the time-triggered function is a value being greater than or equal to $f_1 - \theta$ and less than or equal to $f_1 + \theta$, and the smart contracts can be triggered at fixed time through the time-triggered function.

Thus, the time-triggered function in the scheme provided by some embodiments of the present disclosure may be any function capable of implementing timing, and by the timing, execution of the timed smart contract or the processing logic in the timed smart contract corresponding to the timing is triggered.

In addition, the timed smart contract obtains the time information through the oracle contract deployed on the blockchain, that is, the timed smart contract does not directly interact with the outside. Attack information can be effectively prevented from attacking the timed smart contract by limiting information transmitted by the interface (connecting the oracle contract with the timed smart contract). In addition, one oracle contract may be connected with a plurality of timed smart contracts while the oracle contract is single in function, thereby facilitating a user to maintain the oracle contract.

In addition, when the time-triggered function is the conditional function shown in the foregoing embodiment and a plurality piece of current times continuously received by the oracle contract may all satisfy the foregoing time-triggered function, to prevent a to-be-executed timed smart contract from being repeatedly executed within a condition range limited by the time-triggered function, for timed smart contract being executed each time and completely executed, an identifier corresponding to each-time ongoing execution or an identifier corresponding to each-time completed execution is fed back to the timed oracle contract. Correspondingly, the timed oracle contract may further judge whether to trigger the to-be-executed timed smart contract according to the identifier corresponding to the ongoing execution at present or the identifier corresponding to the completed execution.

In the foregoing embodiments, by monitoring the interface, the time information is acquired, whether the time information satisfies the time-triggered function or not is judged, and whether to execute the timed smart contract with the time-triggered function is judged. The time information and the time-triggered function are combined to trigger the timed smart contract in the blockchain, thereby effectively guaranteeing that the timed smart contract with the time-triggered function in the blockchain can be executed according to the time information.

It is to be noted that execution of the timed smart contract needs to depend on a trust foundation of the whole chain. Thus, in the scheme provided by some embodiments of the present disclosure, the blockchain may be a consortium blockchain.

In some embodiments of the present disclosure, there may be two modes to determine the trusted oracle:

A first mode for determining the trusted oracle:
  a polling mode is adopted to determine the trusted oracle from a plurality of oracles. The polling mode may be polling according to a certain sequence, or random polling.

For example, the plurality of oracles include an oracle a, an oracle b, an oracle c and an oracle d. Based on polling according to a certain sequence, the plurality of oracles may be polled according to the order of the oracle a, the oracle b, the oracle c and the oracle d. The current trusted oracle is the oracle b, and after duration for which the oracle b has been the trusted oracle reaches a certain duration, the oracle c serves as the trusted oracle.

For another example, the plurality of oracles are the oracle a, the oracle b, the oracle c and the oracle d. According to random polling, the current trusted oracle is the oracle b, and after duration for which the oracle b has been the trusted oracle reaches a certain duration, the oracle d is selected at random to serve as the trusted oracle.

A second mode for determining the trusted oracle:
  a vote mode is adopted to select the trusted oracle from the plurality of oracles. The vote mode may be periodically performed, such as every month, every period, and every five days.

There may be two specific vote modes:

A first vote mode: one oracle is preliminarily screened out of the plurality of oracles. For the consortium blockchain or a private blockchain, each node included in the consortium blockchain or the private blockchain votes on the preliminarily-screened oracle, and when a vote proportion (vote proportion: the number of nodes voting yes or voting with assent/the sum of the nodes included in the consortium blockchain or the private blockchain) is not less than a preset proportion threshold, the preliminarily-screened oracle is determined as the trusted oracle; and for a public blockchain, a plurality of trusted nodes included in the public blockchain vote on the preliminarily-screened oracle, and when a vote proportion (vote proportion: the number of nodes voting yes or voting with assent/the sum of the trusted nodes included in the public blockchain) is not less than the preset proportion threshold, the preliminarily-screened oracle is determined as the trusted oracle, where the vote proportion may be correspondingly adjusted according to practical situations and can more truthfully reflect practical situations of vote. The trusted oracle can be rapidly and accurately selected through the first vote mode, credibility of the trusted oracle can be guaranteed to a certain degree, and thus, information security of the blockchain can be effectively improved through communication between the trusted oracle and the blockchain.

A Second Vote Mode:

For the nodes included in the consortium blockchain or the private blockchain or the trusted nodes in the public blockchain, respectively perform: selecting at least one preliminarily-screened oracle from the plurality of oracles, and then counting the number of nodes voting yes (assent) on each preliminarily-screened oracle. Based on a preliminary vote result, forms of further screening the trusted oracle may include:

1. The preliminarily-screened oracle with most affirmative votes is directly selected as the trusted oracle; and if there are at least two preliminarily-screened oracles with most affirmative votes, one oracle randomly selected from the at least two oracles or one oracle with fewest negative votes serves as the trusted oracle.

For example, the nodes for the vote are a node 1, a node 2, a node 6, a node 8 and a node 9 respectively, and the plurality of oracles are the oracle a, the oracle b, the oracle c and the oracle d respectively, where the node 1 votes for the oracle a and the oracle b, the node 2 votes for the oracle a and the oracle c, the node 6 votes for the oracle a and the oracle d, the node 8 votes for the oracle a and the oracle d, the node 9 votes for the oracle a and the oracle c, and thus, the oracle a has the most affirmative votes and serves as the trusted oracle.

2. the preliminarily-screened oracles without negative votes is determined, and the preliminarily-screened oracle with most votes is selected from the preliminarily-screened oracles without negative votes as the trusted oracle.

For example, the plurality of oracles are the oracle a, the oracle b, the oracle c and the oracle d respectively, where the preliminarily-screened oracles without negative votes are the oracle a, the oracle b and the oracle c, and the oracle has most affirmative votes, and thus is selected as the trusted oracle.

3. Preliminarily-screened oracles without negative votes, or preliminarily-screened oracles with the number of affirmative votes not less than the preset threshold or preliminarily-screened oracles with most affirmative votes are re-voted, and the trusted oracle is determined according to a re-vote result.

There may be three screen forms in the second vote mode, which can be correspondingly selected by the user according to needs, thereby flexibly selecting the trusted oracle, preventing the outside from positioning, in a vote mode, the trusted oracle, and thus guaranteeing security of the trusted oracle to a certain degree.

Figure 4:
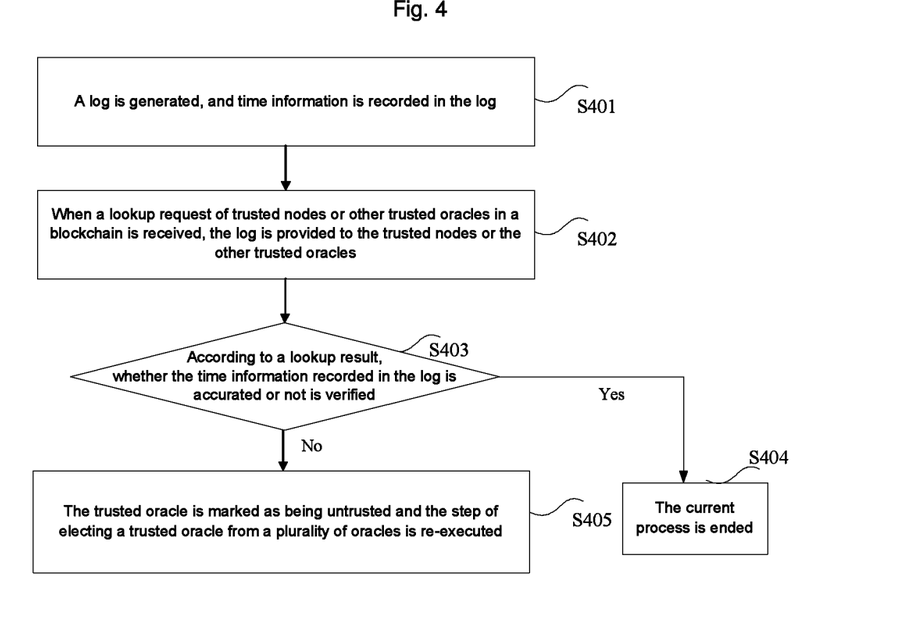
FIG. 4 is a schematic diagram of a main process of execution of a timed smart contract in a blockchain according to some embodiments of the present disclosure.

In some embodiments of the present disclosure, as shown in FIG. 4, the execution method of the timed smart contract in the blockchain may further include following steps:

S401: a log is generated, and time information is recorded in the log.

S402: When a lookup request of trusted nodes or other trusted oracles in the blockchain is received, the log is provided to the trusted nodes or the other trusted oracles.

S403: According to a lookup result, whether the time information recorded in the log is accurate or not is verified, if yes, execute step S404, and if not, execute step S405.

The trusted nodes or other trusted oracles mainly compare a last piece of time information recorded in the log with current time of a device per se, and when a comparison result shows that a difference value between the last piece of time information recorded in the log and the current time of the device per se is not greater than a preset time difference threshold, it is determined that the last piece of time information is matched with time of the trusted nodes or the other trusted oracles. Correspondingly, the lookup result may include: the sum of the trusted nodes or the other trusted oracles looking up the log, the number of the trusted nodes or the other trusted oracles matched with the last piece of time information recorded in the log, etc.

The step of verifying whether the time information recorded in the log is accurate or not may be: verifying whether the number of the trusted nodes or the other trusted oracles matched with the last piece of time information recorded in the log is identical to the sum of the trusted nodes or the other trusted oracles looking up the log or not, and if yes, determining that the time information is accurate.

The step of verifying whether the time information recorded in the log is accurate or not may also be: verifying whether the number of the trusted nodes or the other trusted oracles matched with the last piece of time information recorded in the log is not less than a preset number threshold or not, and if yes, determining that the time information is correct.

S404: The current process is ended.

S405: The trusted oracle to be untrusted is marked and the step of electing a trusted oracle is re-executed from a plurality of oracles.

Through the foregoing process, the time information provided by the trusted oracle can be checked so as to guarantee reliability of the trusted oracle and the time information, thereby guaranteeing execution reliability of the timed smart contract.

In some embodiments of the present disclosure, different types of smart contracts (the timed smart contract and a non-timed smart contract) correspond to different execution modes respectively, the non-timed smart contract may be executed according to an original execution mode, and a corresponding execution mode is independently set for the timed smart contract. By adding the execution mode corresponding to the timed smart contract on the basis of the existing blockchain, effectively simplifying a smart contract execution mode construction process in the blockchain can be implemented, thus saving the cost of constructing the smart contract execution mode in the blockchain.

Figure 5:
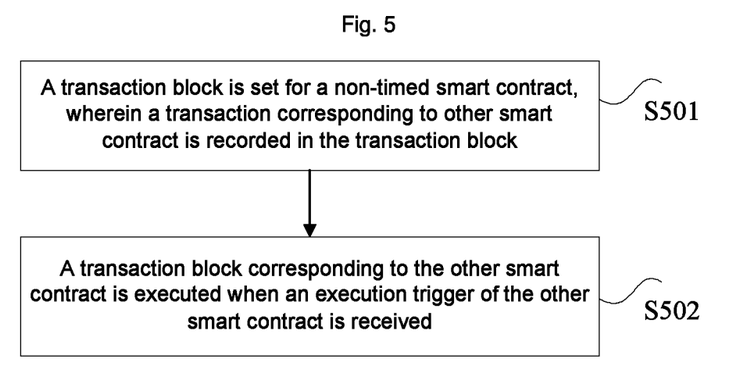
FIG. 5 is a schematic diagram of a main process of execution of a non-timed smart contract in a blockchain according to some embodiments of the present disclosure.

Execution of the Non-Timed Smart Contract:

as shown in FIG. 5, may include following steps:

S501: a transaction block is set for the non-timed smart contract, where a transaction corresponding to other smart contract is recorded in the transaction block.

S502: Transaction block corresponding to the other smart contract is executed when an execution trigger of the other smart contracts is received.

Figure 6:
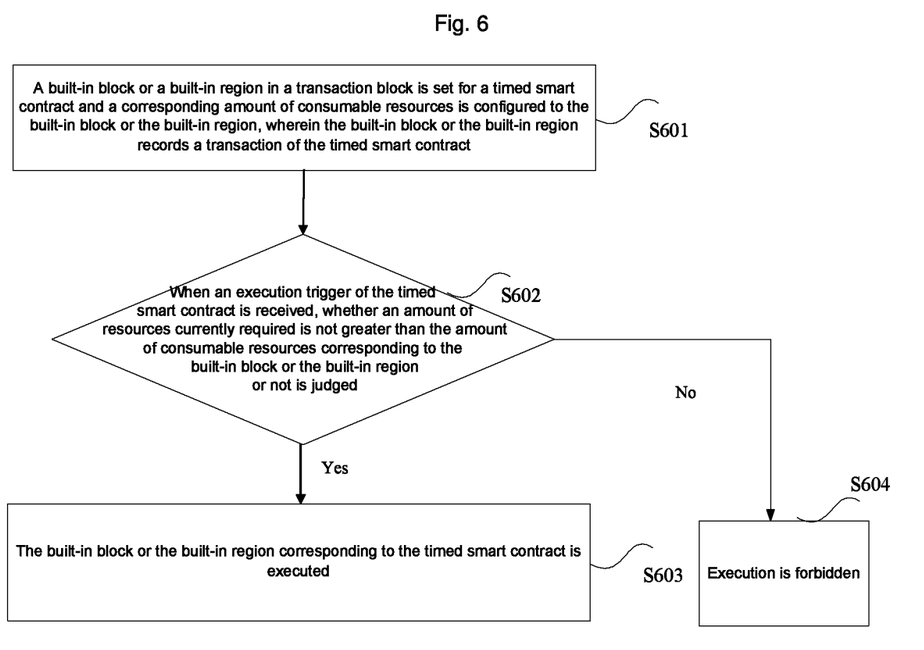
FIG. 6 is a schematic diagram of a main process of execution of a timed smart contract in a blockchain according to some embodiments of the present disclosure.

Execution of the Timed Smart Contract:

as shown in FIG. 6, may include following steps:

S601: A built-in block or a built-in region in a transaction block is set for the timed smart contract and a corresponding amount of consumable resources is configured to the built-in block or the built-in region, where the built-in block or the built-in region records a transaction of the timed smart contract.

S602: When an execution trigger of the timed smart contract is received, whether an amount of resources currently required is not greater than the amount of consumable resources corresponding to the built-in block or the built-in region or not is judged, if yes, execute step S603, and if not, execute step S604.

S603: the built-in block or the built-in region corresponding to the timed smart contract is executed, and the current process is ended.

S604: Execution is forbidden.

The amount of consumable resources refers to the amount of resources capable of being currently supplied by a contracting party executing the timed smart contract.

The amount of current required resources refers to the amount of resources for which the contracting party of the timed smart contract needs to pay during timed smart contract execution.

For example, when the current smart contract is the non-timed smart contract (a smart contract executed through an external trigger out the blockchain), the current smart contract is executed according to some embodiments shown in FIG. 5. When the current smart contract is the timed smart contract, the current smart contract is executed according to some embodiments shown in FIG. 6.

Differentiated execution of the non-timed smart contract and the timed smart contract is implemented according to the embodiments shown in FIG. 5 and FIG. 6. The timed smart contract is executed according to some embodiments shown in FIG. 6, and by configuring the corresponding amount of consumable resources to the built-in block or the built-in region, when the amount of resources is larger than the amount of consumable resource, execution of the timed smart contract will be enforced to be stopped, thereby solving a problem about shutdown caused by infinite loop.

In some embodiments of the present disclosure, the timed smart contract includes at least two time-triggered functions, and each time-triggered function corresponds to a processing logic in the timed smart contract; and correspondingly, the step of executing the timed smart contract may include: executing the processing logic corresponding to the time-triggered function. For example, when a first time obtained at present satisfies a time-triggered function 1 corresponding to a processing logic 1 in the timed smart contract, the processing logic 1 in the timed smart contract is executed. Then, it is to be understood that based on the processing logic 1, a processing logic associated with the processing logic 1 is executed according to processing logics appointed in the timed smart contract; and when a second time obtained at present satisfies a time-triggered function 3 corresponding to a processing logic 3 in the timed smart contract, the processing logic 3 in the timed smart contract is executed. In the foregoing process, segmented execution of the logics in the smart contracts is implemented, so as to satisfy more complex and more diverse requirements of the smart contracts.

The execution method of the timed smart contract in the blockchain is further described in detail from two following situations.

A first situation: one timed smart contract has one time-triggered function capable of triggering execution of the timed smart contract.

Figure 7:
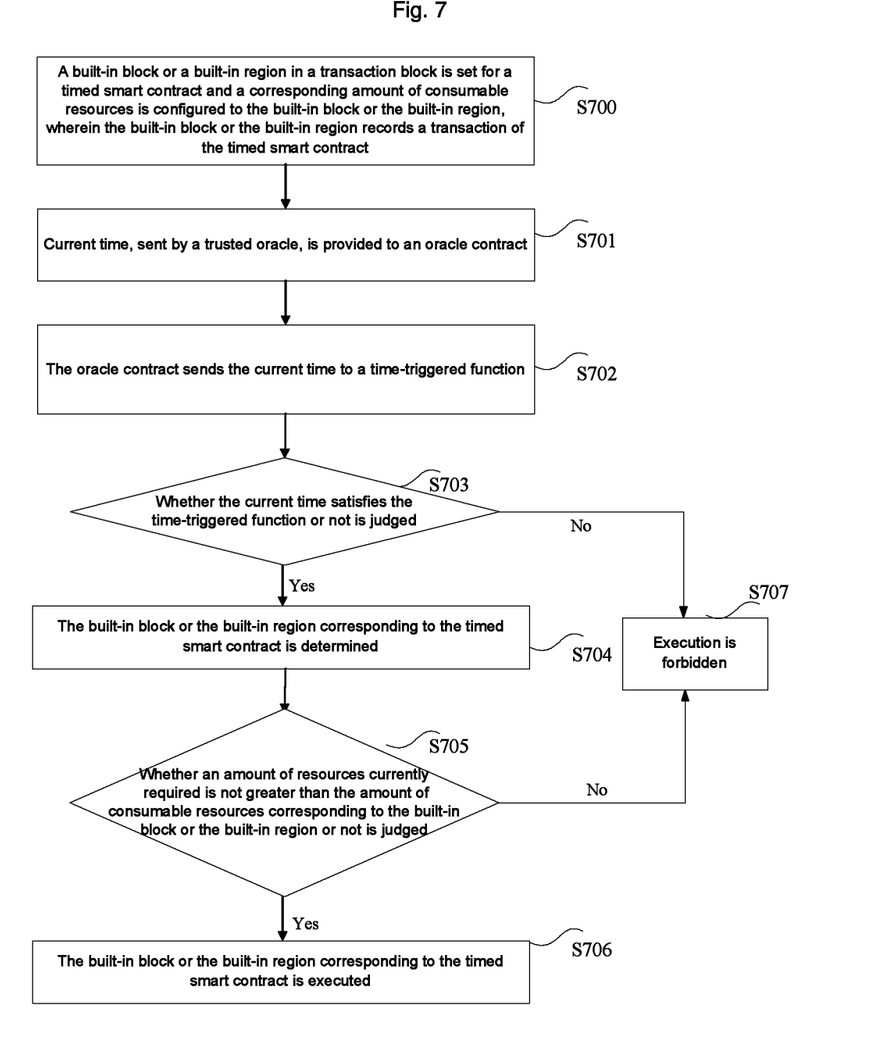
FIG. 7 is a schematic diagram of a main process of execution of a timed smart contract in a blockchain according to some embodiments of the present disclosure.

As shown in FIG. 7, for execution of each timed smart contract in the blockchain, following steps may be cyclically executed:

S700: a built-in block or a built-in region in a transaction block is set for the timed smart contract and a corresponding amount of consumable resources is configured to the built-in block or the built-in region, where the built-in block or the built-in region records a transaction of the timed smart contract.

S701: Current time, sent by a trusted oracle, is provided to an oracle contract.

S702: the current time is sent to a time-triggered function by the oracle contract.

S703: whether the current time satisfies the time-triggered function or not is judged, if yes, step S704 is executed, and if not, step S707 is executed.

S704: The built-in block or the built-in region corresponding to the timed smart contract is determined.

S705: Whether an amount of resources currently required is not greater than the amount of consumable resources corresponding to the built-in block or the built-in region or not is judged, if yes, step S706 is executed, and if not, step S707 is executed.

S706: the built-in block or the built-in region corresponding to the timed smart contract is executed, and the current process is ended.

S707: Execution is forbidden.

A second situation: each of a plurality of processing logics in one timed smart contract respectively corresponds to a time-triggered function capable of triggering execution of the processing logic.

Figure 8:
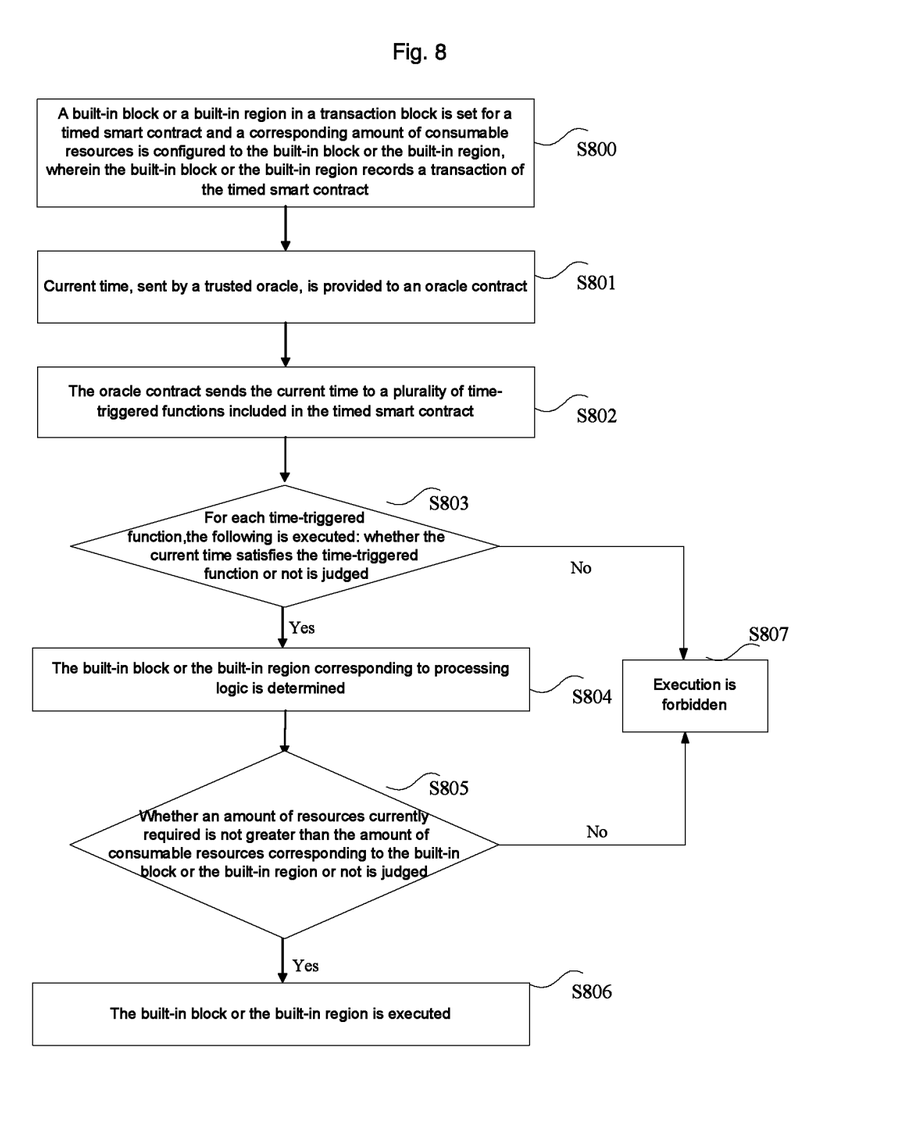
FIG. 8 is a schematic diagram of a main process of execution of processing logics in a timed smart contract according to some embodiments of the present disclosure.

As shown in FIG. 8, for execution of each timed smart contract in the blockchain, following steps may be cyclically executed:

S800: A corresponding built-in block or a built-in region in a transaction block is set for the timed smart contract and a corresponding amount of consumable resources is configured to the built-in block or the built-in region, where the built-in block or the built-in region records a transaction corresponding to processing logic in the timed smart contract.

There may be two implementations for the step:

A first implementation: all the processing logics in the timed smart contract are located in the same built-in block or built-in region in the transaction block, and thus, one timed smart contract corresponds to one built-in block or one built-in region.

A second implementation: each processing logic in the timed smart contract corresponds to one built-in block or one built-in region in the transaction block, and thus, built-in blocks or built-in regions corresponding to the processing logics are determined or connected in series according to a logical relationship among the processing logics in the timed smart contract.

S801: Current time, sent by a trusted oracle, is provided to an oracle contract.

S802: The oracle contract sends the current time to a plurality of time-triggered functions included in the timed smart contract.

S803: For each time-triggered function, the following is executed: whether the current time satisfies the time-triggered function or not is judged, if yes, step S804 is executed, and if not, step S807 is executed.

S804: the built-in block or the built-in region corresponding to the processing logic is determined.

S805: Whether an amount of resources currently required is not greater than the amount of consumable resources corresponding to the built-in block or the built-in region or not is judged, if yes, step S806 is executed, and if not, step S807 is executed.

S806: the built-in block or the built-in region is executed, and the current process is ended.

For the first implementation of step S800, step S806 may be executing transaction corresponding to the processing logic.

For the first implementation of step S800, step S806 may be executing the built-in block or the built-in region corresponding to the processing logic.

S807: Execution is forbidden.

It is to be noted that according to the embodiments shown in FIG. 7 and FIG. 8, the current time received by the oracle contract may also be recorded in a corresponding log file, so as to conveniently verify the current time and guarantee timed execution accuracy of the timed smart contract.

Figure 9:
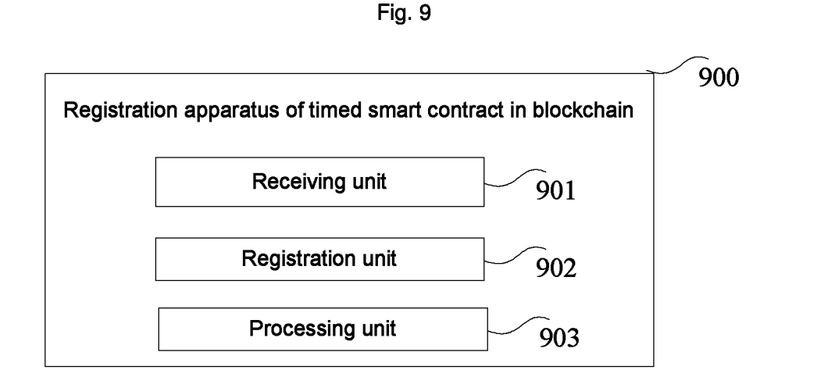
FIG. 9 is a schematic diagram of main units of a registration apparatus of a timed smart contract in a blockchain according to some embodiments of the present disclosure.

As shown in FIG. 9, some embodiments of the present disclosure provides a registration apparatus 900 for a timed smart contract in a blockchain, which may include: a receiving unit 901 and a registration unit 902.

The receiving unit 901 is configured to receive a registration request of the timed smart contract.

The registration unit 902 is configured to, according to the registration request received by the receiving unit 901, generate an interface for the timed smart contract connecting to an oracle contract, where the oracle contract is deployed on the blockchain and configured to receive time information sent by a trusted oracle, so as to supply the time information, by the interface, to the timed smart contract.

In some embodiments of the present disclosure, as shown in FIG. 9, the registration apparatus 900 of a timed smart contract in the blockchain may further include:

a processing unit 903 configured to generate a corresponding transaction block for other smart contract, and record a transaction corresponding to other smart contract in the transaction block, where the other smart contract is a smart contract without an time-triggered function, and thus is executed based on the transaction block.

In some embodiments of the present disclosure, the processing unit 903 is further configured to generate a corresponding built-in block or built-in region in a transaction block for the timed smart contract, configure a corresponding amount of consumable resources to the built-in block or the built-in region in the transaction block, and record a transaction corresponding to the timed smart contract in the transaction block so that the timed smart contract can be executed based on the built-in block or the built-in region in the transaction block.

Figure 10:
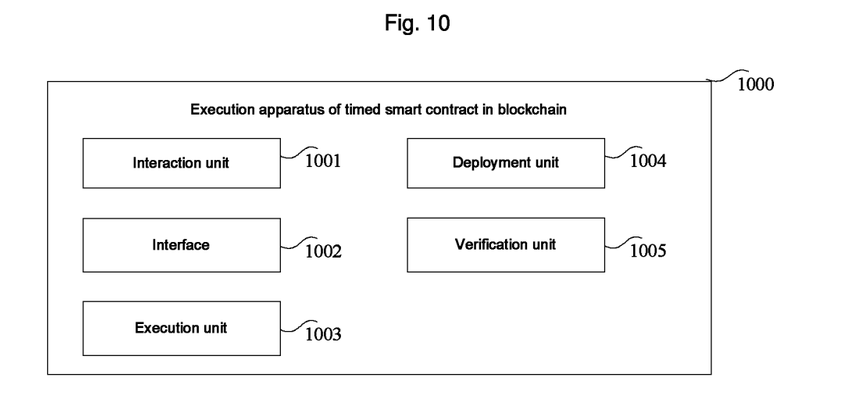
FIG. 10 is a schematic diagram of main units of an execution apparatus of a timed smart contract in a blockchain according to some embodiments of the present disclosure.

As shown in FIG. 10, some embodiments of the present disclosure provides an execution apparatus 1000 for a timed smart contract in a blockchain, which may include: an interaction unit 1001, and an interface 1002 corresponding to each timed smart contract and an execution unit 1003.

The interaction unit 1001 is configured to provide time information, sent by a trusted oracle, to an oracle contract, where the trusted oracle is elected from a plurality of oracles.

The interface 1002 corresponding to each timed smart contract is configured to correspondingly connect the corresponding timed smart contract to the oracle contract and provide the time information received by the oracle contract to the timed smart contract, where the timed smart contract includes a time-triggered function.

The execution unit 1003 is configured to execute the timed smart contract when the time information received by the timed smart contract satisfies the time-triggered function.

In some embodiments of the present disclosure, as shown in FIG. 10, the execution apparatus 1000 of the timed smart contract in the blockchain may further include:

a deployment unit 1004, configured to adopt a polling mode to determine the trusted oracle from the plurality of oracles.

In some embodiments of the present disclosure, the deployment unit 1004 is further configured to adopt a vote mode to select, from the plurality of oracles, the oracle with a vote proportion not less than a preset proportion threshold as the trusted oracle.

In some embodiments of the present disclosure, as shown in FIG. 10, the execution apparatus 1000 of the timed smart contract in the blockchain may further include:

a verification unit 1005 configured to generate a log and record the time information provided by the interaction unit 1001 in the log; when a lookup request of trusted nodes or other trusted oracles in the blockchain is received, provide the log to the trusted nodes or the other trusted oracles; and according to a lookup result, verify whether the time information recorded in the log is accurate or not, and if not, mark the trusted oracle to be untrusted and re-execute the step of electing a trusted oracle from a plurality of oracles.

In some embodiments of the present disclosure, the execution unit 1003 is further configured to set a transaction block for a non-timed smart contract, where a transaction corresponding to other smart contract is recorded in the transaction block; and execute transaction block corresponding to the other smart contract when an execution trigger of the other smart contracts is received.

In some embodiments of the present disclosure, the execution unit 1003 is further configured to set a built-in block or a built-in region in a transaction block for the timed smart contract and configure a corresponding amount of consumable resources to the built-in block or the built-in region, where the built-in block or the built-in region records a transaction of the timed smart contract; and when an execution trigger of the timed smart contract is received, judge whether an amount of resources currently required is not greater than the amount of consumable resources corresponding to the built-in block or the built-in region or not, if yes, execute the built-in block or the built-in region corresponding to the timed smart contract, and if not, forbid execution.

In some embodiments of the present disclosure, the timed smart contract includes at least two time-triggered functions, and each time-triggered function corresponds to one processing logic in the timed smart contract; and the execution unit 1003 is further configured to execute the processing logic corresponding to the time-triggered function.

Figure 11:
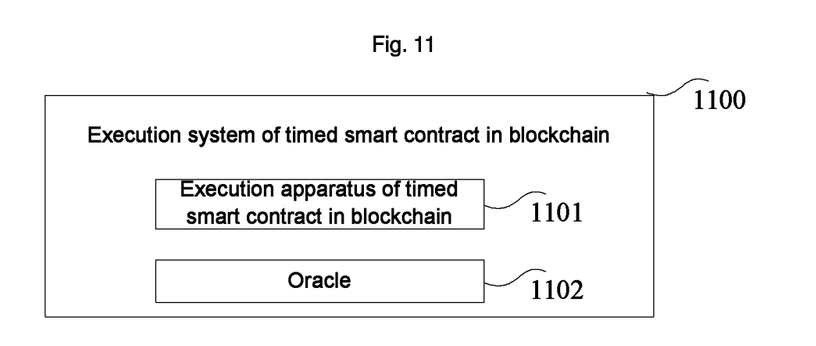
FIG. 11 is a schematic diagram of an execution system of a timed smart contract in a blockchain according to some embodiments of the present disclosure.

As shown in FIG. 11, some embodiments of the present disclosure provides an execution system 1100 of a timed smart contract in a blockchain, which may include: a plurality of oracles 1101 and the execution apparatus 1000 of the timed smart contract in the blockchain according to the foregoing embodiment.

The execution apparatus 1000 of the timed smart contract in the blockchain is further configured to select the trusted oracle from the plurality of oracles.

After each oracle 1101 is elected as the trusted oracle, the oracle 1101 provides time information to an oracle contract through the execution apparatus of the timed smart contract in the blockchain.

In some embodiments of the present disclosure, as shown in FIG. 11, the execution system 1100 of a timed smart contract in a blockchain according to some embodiments of the present disclosure may further include: a trusted node 1103 arranged on the blockchain.

The execution apparatus 1000 of the timed smart contract in the blockchain is further configured to generate a log and record the time information in the log; when a lookup request of the trusted node 1103 or the other trusted oracles in the blockchain is received, provide the log to the trusted nodes or the other trusted oracles; and through the trusted nodes or the other trusted oracles, verify whether the time information recorded in the log is accurate or not, and if not, mark the trusted oracle to be untrusted and re-execute the step of electing a trusted oracle from a plurality of oracles.

Figure 12:
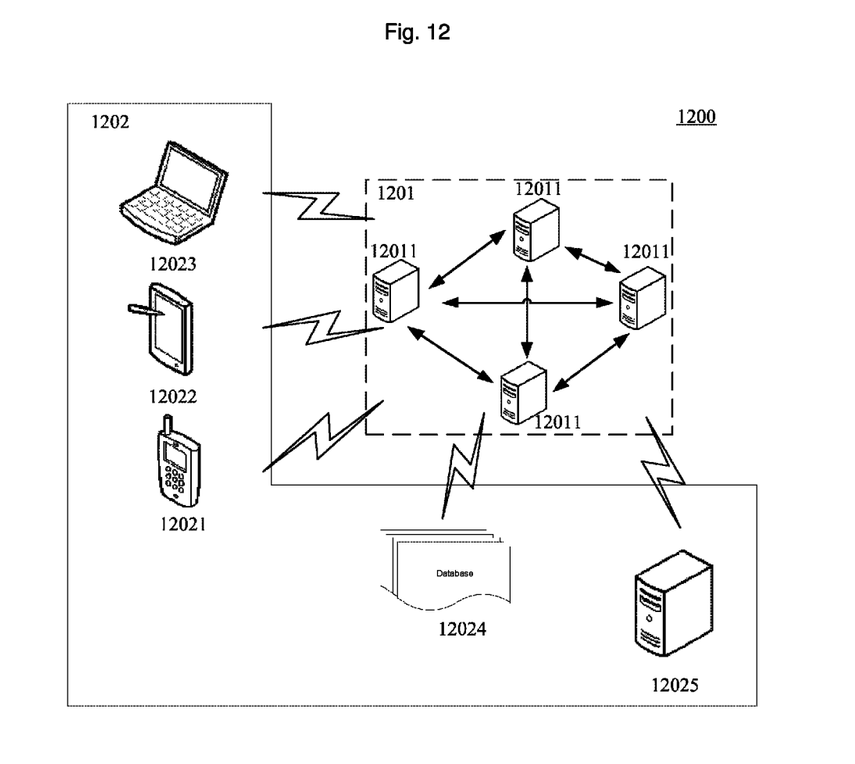
FIG. 12 is a diagram of an exemplary system architecture applying the embodiments of the present disclosure.

FIG. 12 illustrates an exemplary system architecture 1200 capable of applying a registration method of a timed smart contract in a blockchain, or a registration apparatus of a timed smart contract in a blockchain, or an execution method for a timed smart contract in a blockchain, or an execution apparatus of a timed smart contract in a blockchain according to the embodiments of the present disclosure.

As shown in FIG. 12, the system architecture 1200 may include a blockchain network 1201 and a peripheral device 1202 of the blockchain network 1201, where the blockchain network 1201 refers to a network configured to perform data sharing among nodes, and may include a plurality of nodes 12011. Each node 12011, during normal work, may receive input information of the peripheral device 1202 or information broadcast by other nodes, and based on the received information, maintain shared data (i.e., blockchain) in the blockchain network. To guarantee information exchange in the blockchain network 1201, information links may exist among the nodes, Peer-To-Peer (P2P) communication between any two nodes can be realized, and specifically, P2P communication may be performed through a wire communication link or a wireless communication link. For example, when any node in the blockchain network receives the input information, other nodes can acquire the input information according to a consensus algorithm, the input information serves as data in the shared data to be stored, and thus the data stored on all the nodes in the blockchain network is consistent. The peripheral device 1202 may include terminal devices 12021, 12022 and 12023, a database 12024, a business server 12025 and an oracle 12026. The peripheral device 1202 may have access to the blockchain network 1201, and can communicate with the nodes 12011 in the blockchain network 1201.

A timed smart contract and an oracle contract are deployed on the nodes 12011 in the blockchain network 1201. The user may use the terminal devices 12021, 12022 and 12023, the database 12024, the business server 12025 and the oracle 12026 to interact with the blockchain network 1201, so as to receive or send messages, etc. For example, the oracle 12026 sends current time to the oracle contract.

The terminal devices 12021, 12022 and 12023 may be various electronic devices having display screens and supporting web browsing, which include but not limited to a smart phone, a tablet personal computer, a portable laptop, a desk computer, etc.

The nodes 12011 in the blockchain network 1201 may be servers providing various services, such as a management server providing support for transaction data submitted by the user via the terminal devices 12021, 12022 and 12023, a back-stage management server providing support for reconciliation data submitted by the business server 12025 or the database 12024, and a management server providing support for business data or reconciliation data or current time submitted by the oracle 12026 (for the purpose of giving a typical example only). The nodes 12011 in the blockchain network 801 may invoke corresponding smart contracts for the received business data or reconciliation data, so as to perform analysis and other processing on the business data or the reconciliation data according to the smart contracts.

It needs to be explained that the registration method for a smart contract in a blockchain or the execution method for a smart contract in a blockchain according to the embodiments of the present disclosure is commonly executed by the nodes 12011 in the blockchain network 1201, and correspondingly, the registration apparatus for a smart contract in a blockchain or an execution apparatus for a smart contract in a blockchain is commonly arranged in the nodes 12011 in the blockchain network 1201.

It is to be understood that the number of the nodes, the terminal devices, the database, the business server and the oracle in the blockchain network in FIG. 12 is for a schematic purpose merely. According to implementation needs, there may be any number of nodes, terminal devices, databases, business servers and oracles in the blockchain network.

Figure 13:
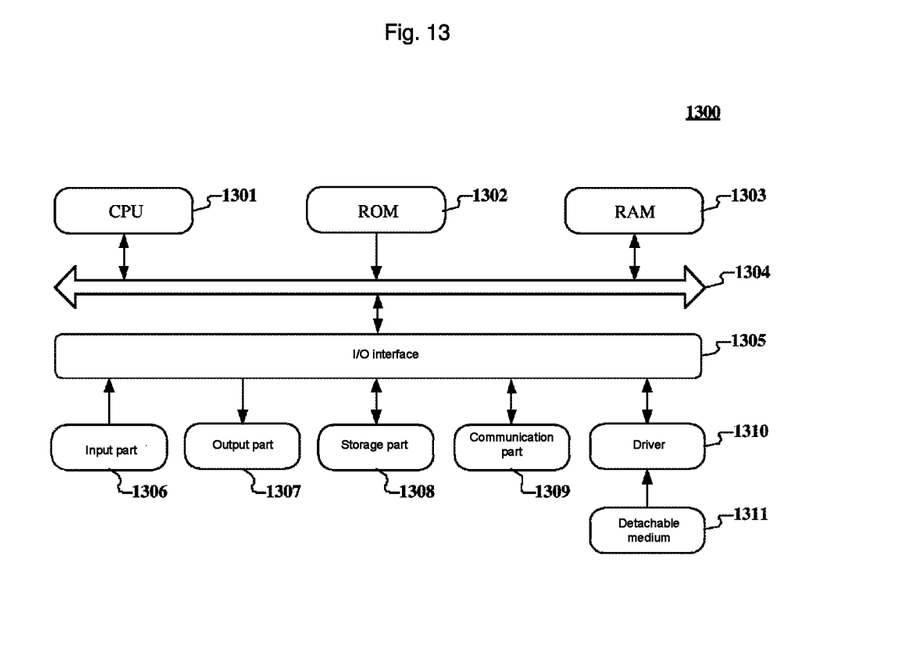
FIG. 13 is a structural schematic diagram of a computer system suitable for implementing nodes in a blockchain according to some embodiments of the present disclosure.

As shown in FIG. 13, a computer system 1300 includes a Central Processing Unit (CPU) 1301 which may perform various proper actions and processing according to programs stored in a Read-Only Memory (ROM) 1302 or programs loaded from a storage part 1308 to a Random Access Memory (RAM) 1303. Various programs and data required for the operation of the system 1300 may also be stored in the RAM 1303. The CPU 1301, the ROM 1302 and the RAM 1303 are connected to one another through a bus 1304. An Input/Output (I/O) interface 1305 is also connected to the bus 1304.

Following components are connected to the I/O interface 1305: an input part 1306 including a keyboard, a mouse, etc.; an output part 1307 including a Cathode Ray Tube (CRT), a Liquid Crystal Display (LCD), etc. and a loudspeaker, etc.; the storage part 1308 including a hard disk, etc.; and a network interface card communication part 1309 including a Local Area Network (LAN) card and a modem. The communication part 1309 performs communication processing through networks such as the Internet. A driver 1310 is connected to the I/O interface 1305 according to needs. A detachable medium 1311, such as a magnetic disk, an optical disk, a photomagnetic disk and a semiconductor memory, is installed on the driver 1310 as needed, so that computer programs read therefrom are installed in the storage part 1308 as needed.

Particularly, the foregoing process described in reference to a flowchart according to the embodiments disclosed by the present disclosure may be implemented as computer software programs. For example, some embodiments disclosed by the present disclosure includes a computer program product including computer programs borne on a computer-readable medium. The computer programs include program codes for executing the method shown by the flowchart. In some embodiments, the computer programs can be downloaded and installed, by the communication part 1309, from the network, and/or be installed from the detachable medium 1311. The computer programs, when executed by the CPU 1301, execute the foregoing functions limited in the system of the present disclosure.

It needs to be explained that the computer-readable medium shown in the present disclosure may be a computer-readable signal medium or a computer-readable storage medium, or any combination of both of the foregoing. For example, the computer-readable storage medium may include but not limited to: electrical, magnetic, optical, electromagnetic, infrared or semiconductor systems, apparatuses or devices, or any combination of the foregoing. More specific examples of the computer-readable medium may include but not limited to: an electrical connector with one or more wires, a portable computer disk, a hard disk, a RAM, a ROM, an Erasable Programmable Read-Only Memory (EPROM or a flash memory), an optical fiber, a portable Compact Disc Read-Only Memory (CD-ROM), a light storage device, a magnetic storage device, or any proper combination of the foregoing. In the present disclosure, the computer-readable storage medium may be any tangible medium including or storing programs, and the programs may be used by an instruction execution system, apparatus or device, or used by a combination thereof. However, in the present disclosure, the computer-readable signal medium may include data signals propagated in a base band or propagated as a part of a carrier wave, which bears computer-readable program codes. The propagated data signals may have a plurality of forms, and include but not limited to electromagnetic signals, optical signals or any above proper combinations. The computer-readable signal medium may be any computer-readable medium except the computer-readable storage medium. The computer-readable medium may send, propagate or transmit the programs used by the instruction execution system, apparatus or device or the combination thereof. The program codes included in the computer-readable medium may be transmitted by any proper medium including but not limited to a wireless mode, a wire, an optical cable, Radio Frequency (RF), etc., or any above proper combinations.

The flowcharts and block diagrams in the drawings illustrate architectures, functions, and operations possibly implemented by the system, the method and the computer program product according to various embodiments of the present disclosure. In this regard, each block in the flowcharts or block diagrams may represent a module, a program segment, or part of the codes, the module, program segment, or part of the codes including one or more executable instructions for implementing specified logical functions. It is to be noted that in some alternative implementations, functions marked in the blocks may also occur in an order different from that marked in the drawings. For example, two successively-represented blocks may actually be executed in parallel substantially, but sometimes they may also be executed in a reverse order, which depends on involved functions. It should be further noted that each block in the block diagrams or the flowcharts as well as a combination of the blocks in the block diagrams and/or the flowcharts may be implemented by using a dedicated hardware-based system that executes specified functions or operations, or using a combination of special hardware and computer instructions.

Describing the units involved in the embodiments of the present disclosure may be implemented in a software mode or a hardware mode. The described units may also be arranged in a processor, and for example, may be described in a manner that a processor includes a receiving unit and a registration unit. The names of the units do not limit the units per se under some situations. For example, the receiving unit may also be described as "a unit receiving a registration request of a timed smart contract".

According to another aspect, the present disclosure further provides a computer-readable medium. The computer-readable medium may be included in the device described in the foregoing embodiment, and may independently exist without being assembled in the device. The foregoing computer-readable medium bears one or more programs. When the one or more programs are executed by one device, the device is made to execute: receiving a registration request of a timed smart contract; and according to the registration request, generating an interface for the timed smart contract connected to an oracle contract, where the oracle contract is deployed on a blockchain and configured to receive time information sent by a trusted oracle, so as to supply the time information to the timed smart contract through the interface.

According to another aspect, the present disclosure further provides a computer-readable medium. The computer-readable medium may be included in the device described in the foregoing embodiment, and may independently exist without being assembled in the device. The foregoing computer-readable medium bears one or more programs. When the one or more programs are executed by one device, the device is made to execute: providing time information, sent by a trusted oracle, to an oracle contract, where the trusted oracle is elected from a plurality of oracles; providing the time information to the timed smart contract through an interface, where the timed smart contract includes a time-triggered function and is connected to the oracle contract through the interface; and executing the timed smart contract under a condition the time information satisfies the time-triggered function.

According to the technical scheme of the embodiment of the present disclosure, the interface connecting the timed smart contract to the oracle contract can be generated by registering the timed smart contract deployed on the blockchain, and after the oracle contract receives the time information sent by the trusted oracle, the time information is sent to the timed smart contract by the interface so that the timed smart contract can be executed at fixed time according to the time information, thereby managing and executing the timed smart contract through the blockchain.

In addition, the time-triggered function may be any function capable of implementing timing, and by the timing, execution of the timed smart contract or the processing logics in the timed smart contract corresponding to the timing is triggered.

In addition, the timed smart contract obtains the time information through the oracle contract deployed on the blockchain, that is, the timed smart contract does not directly interact with the outside, and attack information can be effectively prevented from attacking the timed smart contract by limiting information transmitted by the interface (connecting the oracle contract with the timed smart contract). In addition, one oracle contract may be connected with a plurality of timed smart contracts while the oracle contract is single in function, thereby facilitating the user to maintain the oracle contract.

The foregoing specific implementations do not limit the scope of protection of the present disclosure. Those skilled in the art should understand that various modifications, combinations, sub-combinations and substitutions may occur based on design demands and other factors. Any modification, equivalent replacement, improvement, etc., made within the spirit and principle of the present disclosure shall fall within the scope of protection of the present disclosure.

What is claimed is:

1. A registration method of a timed smart contract in a blockchain, comprising:
   receiving a registration request of the timed smart contract; and
   according to the registration request, generating, for the timed smart contract, an interface for the timed smart contract connecting to an oracle contract, wherein the oracle contract is deployed on the blockchain and configured to receive time information sent by a trusted oracle, so as to supply the time information to the timed smart contract through the interface;

wherein the timed smart contract refers to a smart contract, which has a timed-triggered function and is timed-triggered by combining time and the timed-triggered function, and when the time information satisfies the timed-triggered function, the timed smart contract is executed.

2. The registration method for the timed smart contract in the blockchain according to claim 1, further comprising:
generating a corresponding transaction block for other smart contract, and recording a transaction corresponding to the other smart contract in the transaction block, wherein the other smart contract is a smart contract without an event-triggered function, and thus is executed based on the transaction block.

3. The registration method for the timed smart contract in the blockchain according to claim 2, further comprising:
for the timed smart contract, generating a corresponding built-in block or a built-in region in a transaction block; and
configuring a corresponding amount of consumable resources for the built-in block or the built-in region in the transaction block, and recording a transaction corresponding to the timed smart contract in the transaction block so that the timed smart contract is able to be executed based on the built-in block or the built-in region in the transaction block.

4. An execution method of a timed smart contract in a blockchain, comprising:
providing time information, sent by a trusted oracle, to an oracle contract, wherein the trusted oracle is elected from a plurality of oracles;
providing the time information to the timed smart contract through an interface, wherein the timed smart contract comprises a time-triggered function and is connected to the oracle contract through the interface; and
executing the timed smart contract under a condition the time information satisfies the time-triggered function;
wherein the timed smart contract refers to a smart contract, which has a timed-triggered function and is timed-triggered by combining time and the timed-triggered function.

5. The execution method of the timed smart contract in the blockchain according to claim 4, further comprising:
adopting a polling mode to determine the trusted oracle from the plurality of oracles;
or,
adopting a vote mode to select the trusted oracle from the plurality of oracles.

6. The execution method of the timed smart contract in the blockchain according to claim 4, further comprising:
generating a log, and recording the time information in the log;
when a lookup request of a trusted node or other trusted oracle in the blockchain is received, providing the log to the trusted node or the other trusted oracle; and
according to a lookup result, verifying whether the time information recorded in the log is accurate or not,
if not, marking the trusted oracle as being un-trusted and re-executing a step of electing the trusted oracle from the plurality of oracles.

7. The execution method of the timed smart contract in the blockchain according to claim 4, further comprising:
setting a transaction block for a non-timed smart contract, wherein a transaction corresponding to the other smart contracts is recorded in the transaction block; and
executing the transaction block corresponding to the other smart contract when an execution trigger of the other smart contract is received.

8. The execution method of the timed smart contract in the blockchain according to claim 7,
further comprising: for the timed smart contract, setting a built-in block or a built-in region in a transaction block; and configuring a corresponding amount of consumable resources to the built-in block or the built-in region, wherein the built-in block or the built-in region records a transaction corresponding to the timed smart contract, and
executing the timed smart contract comprising:
when an execution trigger of the timed smart contract is received, judging whether an amount of resources currently required is not greater than the amount of consumable resources corresponding to the built-in block or the built-in region or not, if yes, executing the built-in block or the built-in region corresponding to the timed smart contract, and if not, forbidding execution.

9. The execution method of the timed smart contract in the blockchain according to claim 4, wherein
the timed smart contract comprises at least two time-triggered functions, and each time-triggered function corresponds to one processing logic in the timed smart contract; and
executing the timed smart contract comprises: executing a processing logic corresponding to a time-triggered function.

10. A registration electronic device of a timed smart contract in a blockchain, comprising:
one or more processors; and
a memory device configured to store one or more programs,
wherein when the one or more programs are executed by the one or more processors, the one or more processors implement following actions:
receiving a registration request of the timed smart contract; and
according to the registration request, generating, for the timed smart contract, an interface for the timed smart contract connecting to an oracle contract, wherein the oracle contract is deployed on the blockchain and configured to receive time information sent by a trusted oracle, so as to supply the time information to the timed smart contract through the interface; wherein the timed smart contract refers to a smart contract, which has a timed-triggered function and is timed-triggered by combining time and the timed-triggered function, and when the time information satisfies the timed-triggered function, the timed smart contract is executed.

11. A non-transitory computer-readable medium, storing a computer program, wherein the computer program is executed by a processor to implement following actions:
receiving a registration request of the timed smart contract; and
according to the registration request, generating, for the timed smart contract, an interface for the timed smart contract connecting to an oracle contract, wherein the oracle contract is deployed on the blockchain and configured to receive time information sent by a trusted oracle, so as to supply the time information to the timed smart contract through the interface; wherein the timed smart contract refers to a smart contract, which has a timed-triggered function and is timed-triggered by combining time and the timed-triggered function, and when the time information satisfies the timed-triggered function, the timed smart contract is executed.

12. The registration electronic device of the timed smart contract in the blockchain according to claim 10, further comprising:
generating a corresponding transaction block for other smart contract, and recording a transaction corresponding to the other smart contract in the transaction block, wherein the other smart contract is a smart contract without an event-triggered function, and thus is executed based on the transaction block.

13. The registration electronic device of the timed smart contract in the blockchain according to claim 12, further comprising:
for the timed smart contract, generating a corresponding built-in block or a built-in region in a transaction block; and
configuring a corresponding amount of consumable resources for the built-in block or the built-in region in the transaction block, and recording a transaction corresponding to the timed smart contract in the transaction block so that the timed smart contract is able to be executed based on the built-in block or the built-in region in the transaction block.

14. The registration electronic device of the timed smart contract in the blockchain according to claim 10, wherein the one or more processors further implement the following actions:
providing time information, sent by a trusted oracle, to an oracle contract, wherein the trusted oracle is elected from a plurality of oracles;
providing the time information to the timed smart contract through an interface, wherein the timed smart contract comprises a time-triggered function and is connected to the oracle contract through the interface; and
executing the timed smart contract under a condition the time information satisfies the time-triggered function.

15. The registration electronic device of the timed smart contract in the blockchain according to claim 14, further comprising:
adopting a polling mode to determine the trusted oracle from the plurality of oracles;
or,
adopting a vote mode to select the trusted oracle from the plurality of oracles.

16. The registration electronic device of the timed smart contract in the blockchain according to claim 14, further comprising:
generating a log, and recording the time information in the log;
when a lookup request of a trusted node or other trusted oracle in the blockchain is received, providing the log to the trusted node or the other trusted oracle; and
according to a lookup result, verifying whether the time information recorded in the log is accurate or not,
if not, marking the trusted oracle as being un-trusted and re-executing a step of electing the trusted oracle from the plurality of oracles.

17. The registration electronic device of the timed smart contract in the blockchain according to claim 14, further comprising:
setting a transaction block for a non-timed smart contract, wherein a transaction corresponding to the other smart contracts is recorded in the transaction block; and
executing the transaction block corresponding to the other smart contract when an execution trigger of the other smart contract is received.

18. The registration electronic device of the timed smart contract in the blockchain according to claim 17,
further comprising: for the timed smart contract, setting a built-in block or a built-in region in a transaction block; and configuring a corresponding amount of consumable resources to the built-in block or the built-in region, wherein the built-in block or the built-in region records a transaction corresponding to the timed smart contract, and
executing the timed smart contract comprising:
when an execution trigger of the timed smart contract is received, judging whether an amount of resources currently required is not greater than the amount of consumable resources corresponding to the built-in block or the built-in region or not, if yes, executing the built-in block or the built-in region corresponding to the timed smart contract, and if not, forbidding execution.

19. The registration electronic device of the timed smart contract in the blockchain according to claim 14, wherein
the timed smart contract comprises at least two time-triggered functions, and each time-triggered function corresponds to one processing logic in the timed smart contract; and
executing the timed smart contract comprises: executing a processing logic corresponding to a time-triggered function.

* * * * *